(No Model.)

O. P. BRIGGS.
WIRE CLAMPING DEVICE.

No. 471,096. Patented Mar. 22, 1892.

Witnesses.
Wm. M. Rheem.
Louis M. F. Whitehead.

Inventor.
Orlando P. Briggs
by Dayton, Poole
& Brown
Atty's

THE NORRIS PETERS CO., PHOTO-LITHO., WASHINGTON, D. C.

UNITED STATES PATENT OFFICE.

ORLANDO P. BRIGGS, OF CHICAGO, ILLINOIS, ASSIGNOR OF ONE-HALF TO CHARLES L. JENNESS, OF SAME PLACE.

WIRE-CLAMPING DEVICE.

SPECIFICATION forming part of Letters Patent No. 471,096, dated March 22, 1892.

Application filed September 12, 1891. Serial No. 405,483. (No model.)

*To all whom it may concern:*

Be it known that I, ORLANDO P. BRIGGS, of Chicago, in the county of Cook and State of Illinois, have invented certain new and useful Improvements in Wire-Clamping Devices; and I do hereby declare that the following is a full, clear, and exact description thereof, reference being had to the accompanying drawings, and to the letters of reference marked thereon, which form a part of this specification.

My invention relates to wire-clamping devices for supporting wires, and more particularly for supporting electric-line wires of electric railways using the trolley system, and has for its object to devise a simple and effective clamping device which will firmly grip and hold the wire.

To these ends my invention consists in certain novel features which I will now proceed to describe, and will then particularly point out in the appended claims.

Figure 1:
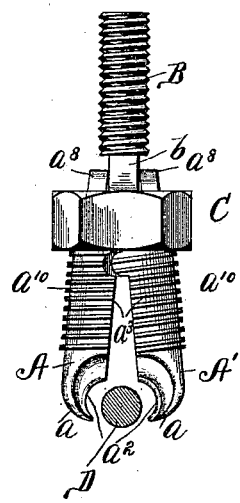
Figure 2:
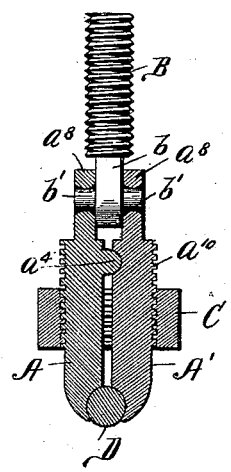
Figure 3:
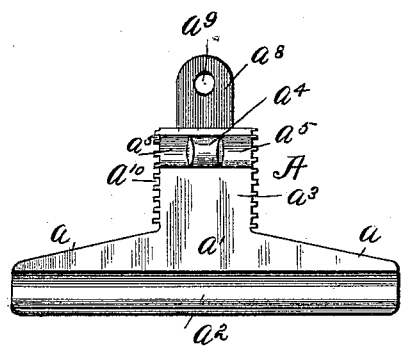
Figure 4:
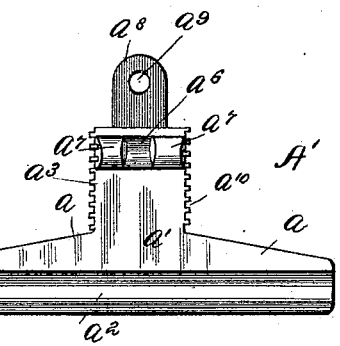
Figure 5:
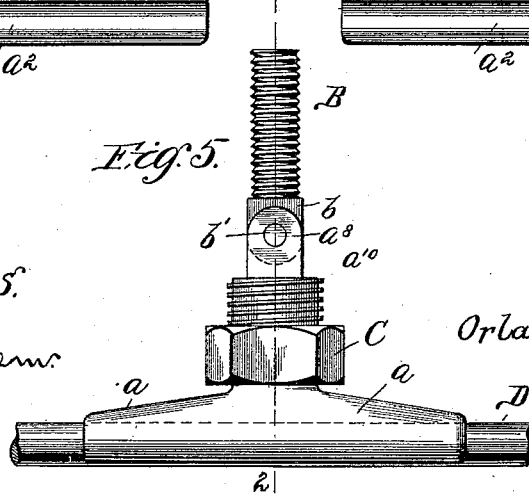

In the accompanying drawings, Figure 1 is an end elevation of a clamping device embodying my invention in one form, the parts being shown in position with the jaws open to receive the wire. Fig. 2 is a sectional view taken on the line 2 2 of Fig. 5. Fig. 3 is an inner face elevation of one of the clamping members. Fig. 4 is a similar view of the other member. Fig. 5 is a side elevation of the device.

In the said drawings, A and A' represent the two clamping members of the device, each provided with an elongated body $a$, having formed in its flat inner face $a'$ a longitudinal groove $a^2$ to receive the wire. Each of these members is provided at its center with an upwardly-extending semi-cylindrical shank $a^3$, the inner flat faces of these half-shanks being flush with the corresponding faces of the bodies $a$. The inner faces of the members A A' are separated by means of one or more projections located near the top of each shank and forming a fulcrum or fulcra, on which the members may vibrate when free. In the present instance I have shown the member A as provided with a central projection $a^4$ and grooves or recesses $a^5$ on each side thereof, while the member A' is provided with a central groove or recess $a^6$ and lateral projections $a^7$ on each side thereof. The projections interlock, the projection $a^4$ fitting the recess $a^6$ and the projections $a^7$ fitting the recesses $a^5$, the recesses and the projections being rounded or curved in the manner shown to permit free relative movement of the parts. Each shank $a^3$ is provided at its upper end with a lug $a^8$, by means of which it is connected by a loose pivotal connection with a threaded stem B, provided at its lower end with a lug $b$, which fits between the lugs $a^8$. In the present instance this loose pivotal connection is shown as effected by providing the lug $b$ with pins $b'$, one on each side thereof, and providing each of the lugs $a^8$ with an aperture $a^9$ somewhat larger than the pin. It is obvious, however, that the form of connection employed at this point may be varied.

The shanks $a^3$ are threaded externally, as shown at $a^{10}$, the thread being preferably cylindrical, as shown, although it may be tapered, if desired, increasing in diameter downward.

C is a nut which fits upon the shanks $a^3$ when the parts are assembled.

In operation, when the parts are in the position shown in Fig. 1, the wire D may be inserted between the clamping members, when by screwing the nut C downward said members will be tilted upon their fulcra after the nut has passed the point where these latter are located, so as to firmly grip the wire in the manner shown in Figs. 2 and 5, the loose connection with the threaded stem B permitting this movement of the members. When the fulcra are constructed in the manner shown, the engagement of the lugs prevents relative longitudinal displacement of the members and takes all longitudinal strain from the pivotal connection between the clamping device proper and the threaded stem. This latter screws into an insulator in the usual manner. By removing the nut C the several members may be entirely separated.

I claim—

1. In a wire-clamping device, the combination, with two clamping members provided with externally-threaded half-shanks and an intermediate fulcrum or fulcra, of a nut adapted to fit said half-shanks when assembled and to tilt said members upon said fulcrum or fulcra to cause the clamping members to grip or release the wire, substantially as described.

2. In a wire-clamping device, the combination, with two clamping members provided with externally-threaded half-shanks and an intermediate fulcrum or fulcra, said shanks being connected with a threaded stem by a loose pivotal connection, of a nut adapted to fit said half-shanks when assembled, substantially as described.

3. In a wire-clamping device, the combination, with two clamping members having externally-threaded half-shanks and interlocking fulcrum projections, of a nut adapted to fit said half-shanks when assembled, substantially as described.

4. In a wire-clamping device, the combination, with two clamping members having externally-threaded half-shanks with interlocking fulcrum projections and each provided with an apertured lug, of a stem provided with a lug having pins to loosely fit the apertures of the lugs on the half-shanks and a nut adapted to fit the half-shanks when assembled, substantially as described.

In testimony that I claim the foregoing as my invention I affix my signature in presence of two witnesses.

ORLANDO P. BRIGGS.

Witnesses:
C. CLARENCE POOLE,
IRVINE MILLER.